United States Patent [19]

Kawakami et al.

[11] 4,075,096
[45] Feb. 21, 1978

[54] SUCTION DEVICE FOR AN OIL SEPARATION TANK

[75] Inventors: Hiroshi Kawakami, Kamakura; Yukio Tsukagawa; Isao Nagaoka, both of Yokohama, all of Japan

[73] Assignee: Bridgestone Tire Company Limited, Tokyo, Japan

[21] Appl. No.: 723,865

[22] Filed: Sept. 16, 1976

[30] Foreign Application Priority Data

Sept. 18, 1975 Japan .................. 50-127279

[51] Int. Cl.² .................. B01D 21/24
[52] U.S. Cl. .................. 210/96 R; 210/DIG. 25; 210/104; 210/242 R; 210/416 L
[58] Field of Search .............. 210/103, 104, 105, 242, 210/DIG. 25, 340, 111, 96 R, 416

[56] References Cited

U.S. PATENT DOCUMENTS

| 3,291,562 | 12/1966 | Anderson | 210/340 |
| 3,339,736 | 9/1967 | Muller | 210/111 |
| 3,578,171 | 5/1971 | Usher | 210/242 |
| 3,635,342 | 1/1972 | Mourlon | 210/DIG. 25 |
| 3,715,416 | 2/1973 | Campbell et al. | 210/340 |
| 3,727,766 | 4/1973 | Horne et al. | 210/242 |
| 3,752,317 | 8/1973 | Lithen | 210/242 |
| 3,753,492 | 8/1973 | Altello et al. | 210/242 |
| 3,909,416 | 9/1975 | Iny Geld | 210/242 |

Primary Examiner—Theodore A. Granger
Attorney, Agent, or Firm—Sughrue, Rothwell, Mion, Zinn and Macpeak

[57] ABSTRACT

A suction device for an oil separation tank mounted on a floating body comprises a liquid piping structure for transporting floating oil from the oil separation tank into a storage tank and a vacuum piping structure for always retaining floating oil in the oil separation tank at a suction state, and may automatically control an intermittent suction operation.

3 Claims, 1 Drawing Figure

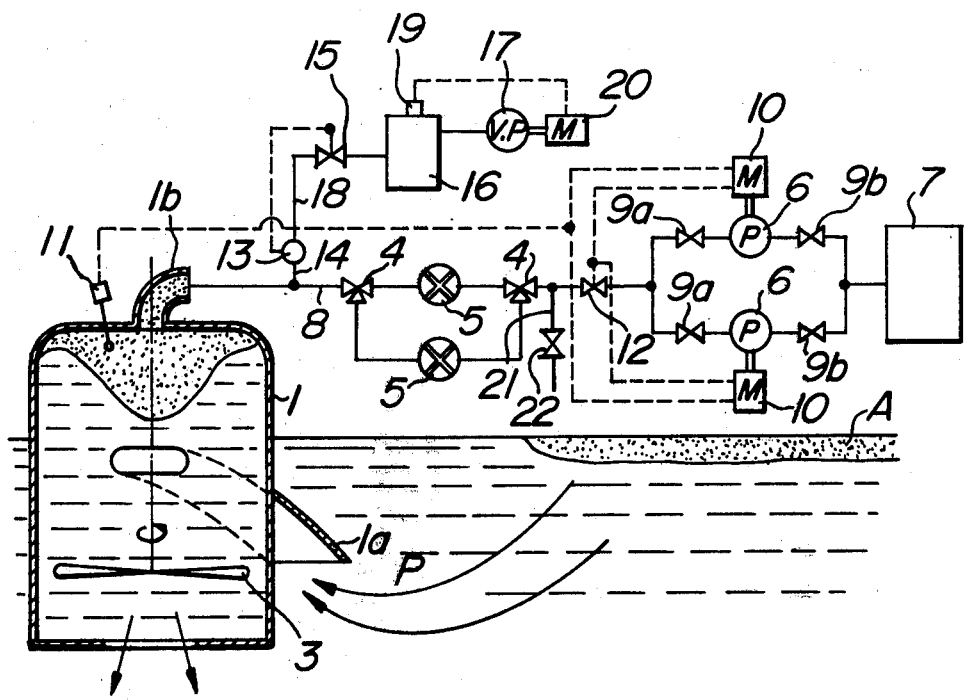

SUCTION DEVICE FOR AN OIL SEPARATION TANK

BACKGROUND OF THE INVENTION

1. Field of the Invention

This invention relates to a device for recovering floating matter from water surface, and more particularly to an improvement of a suction device for an oil separation tank, said tank being mounted on a floating body such as ships, etc. and closed at its upper part and opened at its lower part and including a socket opened below water level for receiving an upward flow of floating oil which has been drawn into water.

2. Description of the Prior Art

Petroleum or the like which is leaked from a tanker or a ship onto water surface is one of major sources of pollutants which cause sea pollution. Hitherto, there have been used various devices for recovering floating matter in order to prevent diffusion of petroleum or the like over water surface. In such devices, there is generally used a belt device comprising a pair of pulleys and an endless belt closely engaged therein, which is mounted on a floating body such as ships and the like. In this device, one of the pulleys is arranged above water level and the other pulley is arranged below water level, whereby the endless belt is circularly driven above and below the water level. Thus, the floating matter is made into contact with and pulled by the lower travelling portion of the belt into the water. Then, the floating matter is turned upwardly in a floating direction around the pulley arranged below the water level and fed into an inverted and bottomed oil separation tank having a socket opened below water level, where the floating matter having a low water content is recovered by a gravity separation. Then, the floating matter recovered in the upper portion of the tank is successively transported into a storage tank through a conduit by means of a suction device provided on the top of the oil separation tank.

SUMMARY OF THE INVENTION

This invention is concerned with an improvement of this type of the suction device for oil separation tank and to provide a suction device in which a space occupied in a floating body such as ships, etc. is small and an intermittent suction may be automatically operated without difficulty.

According to the invention, there is provided in a suction device for an oil separation tank, said tank being mounted on a floating body such as ships, etc. and closed at its upper part and opened at its lower part and including a socket opened below water level for receiving an upward flow of floating oil which has been drawn into water. The improvement to the system comprises a suction inlet provided at the top of the oil separation tank; the suction inlet being connected through a conduit to a strainer, a liquid pump and a storage tank in succession; the liquid pump being driven by a motor which is electrically connected to an oil detector and an electromagnetic valve. The oil detector is provided in the upper part of the oil separation tank so as to control energization and deenergization of the motor in response to the presence and absence of oil in the oil separation tank. The electromagnetic valve is connected to that part of the conduit which is located in front of the liquid pump and opened and closed in response to the energization and deenergization of the motor; the conduit including a branch near the oil separation tank which is communicated with a full water detector. The full water detector being connected through an air conduit to an electromagnetic valve, a vacuum vessel and a vacuum pump in succession and electrically connected to the electromagnetic valve so as to control its opening and closing. Also, the vacuum vessel includes a vacuum switch which serves to control energization and deenergization of a motor for driving the vacuum pump.

BRIEF DESCRIPTION OF THE DRAWING

The invention will now be described with reference to the accompanying drawing, wherein:

The single FIGURE is a systematic block diagram of a suction device for an oil separation tank according to the invention.

DESCRIPTION OF THE PREFERRED EMBODIMENT

Referring to this FIGURE, numeral 1 represents an inverted and bottomed oil separation tank for separating floating oil A from water, which is mounted on a floating body (not shown) such as ships, etc. and closed at its upper part and opened at its lower part. The oil separation tank 1 includes a socket 1a opened below water level for receiving an upward flow of floating oil A which has been drawn into water in a direction shown by an arrow P by means of a suitable forced pull-in device such as a conventional belt device or the like (not shown).

In the oil separation tank 1, the floating oil A is separated from water by gravity separation, whereby the former is collected in the upper part of the tank, while the latter is discharged through the opened bottom of the tank. A whirl generating means 3 such as a propeller or the like may be provided in the oil separation tank 1 so as to give a centrifugal force for accelerating the separation performance.

Then, the separated oil is transported from a suction inlet 1b provided at the top of the tank 1 through a conduit 8 into a storage tank 7. In a preferred embodiment of the invention, the suction inlet 1b is connected through the conduit 8 to two strainers 5 and 5, which are inserted in parallel between two three-way valves 4 and 4, two liquid pumps 6 and 6, which are inserted in parallel between two front valves 9a and two rear valves 9b, and the storage tank 7 in succession. If one of two strainers 5, 5 is clogged by debris incorporated in the floating oil, the other strainer is used by selectively changing over the three-way valves 4 and 4, during which the clogged strainer may be cleaned. The two liquid pumps 6, 6 have different capacities with each other so as to be effectively used in accordance with the floating state of the oil A. Each of the liquid pumps 6, 6 is driven by a motor 10 such as hydraulic motor, etc. This motor is electrically connected to an oil detector 11 provided in the upper part of the oil separation tank 1 so as to control energization and deenergization of the motor in response to the presence and absence of oil collected in the tank 1. And also, the motor 10 is electrically connected to an electromagnetic valve arranged on the conduit 8 in front of the liquid pump 6 so as to control opening and closing of the valve in response to the energization and deenergization of the motor. The foregoing is concerned with a liquid piping structure for transporting the floating oil from the oil separation tank 1 into the storage tank 7.

The following will be explained with respect to a vacuum piping structure for always sucking liquids in the oil separation tank 1, i.e. oil and water into the conduit 8 in the vicinity of the tank 1. In the conduit 8 near the oil separation tank 1 is provided a branch 14 which is communicated with a full water detector 13. This full water detector 13 is connected through an air conduit 18 to an electromagnetic valve 15, a vacuum vessel 16 and a vacuum pump 17 in succession and electrically connected to the electromagnetic valve 15 so as to control its opening and closing. Further, the vacuum vessel 16 includes a vacuum switch 19 which serves to control energization and deenergization of a motor 20 such as electric motor or the like for driving the vacuum pump 17 and which is electrically connected to the motor 20.

The function of the suction device according to the invention will be described below.

In operation, the liquid in the oil separation tank 1, i.e. oil A or water is alwasy sucked into the full water detector 13 through the conduit 8 and the branch 14 due to negative pressure in the vacuum vessel 16. If the liquid is detected by the full water detector 13, the electromagnetic valve 15 is closed so as to retain the liquid at the suction state. If air is incorporated into the oil separation tank 1, the electromagnetic valve 15 is opened through the full water detector 13 so as to always full the liquid with the conduit 8 and the branch 14 up to the full water detector 13. In this case, if vacuum degree in the vacuum vessel 16 lowers, the vacuum pump 17 is driven by the vacuum switch 19 so as to return its vacuum degree to the desired original valve.

In the suction state as described above, the floating oil A is collected in the upper part of the oil separation tank 1. Then, the liquid pump 6 is driven with the motor 10 by signal from the oil detector 11. In this way, the oil is transported into the storage tank 7 through the strainer 5 and the conduit 8. When the oil is completely left from the oil separation tank 1, the liquid pump 6 is automatically stopped by the oil detector 11. The electromagnetic valve 12, which is located at the rear of the strainer 5, is opened and closed in response to the energization and deenergization of the liquid pump 6.

If the storage tank 7 is filled with the oil, the liquid is passed through a branch 21 located in the conduit 8 in front of the liquid pump 6 by reversely driving the liquid pump 6 and then discharged outside the floating body. In this case, the electromagnetic valve 12 is closed, while a valve 22 provided in the branch 21 is opened. The opening and closing of the valve 22 is usually carried out by manual.

As described above, the suction device for oil separation tank according to the invention is very suitable in locating on the floating body with a certain defined space such as ships, etc., and also the intermittent suction operation may be completely automatized without causing troubles, so that there are advantages that the recovery of floating oil is very effective and so on.

What is claimed is:

1. In a suction device for an oil separation tank, the tank being mounted on a floating body and closed at its upper part and opened at its lower part and including a socket opened below water level for receiving an upward flow of floating oil which has been drawn into water, the improvement comprising, a suction inlet provided at the top of said oil separation tank; said suction inlet being connected through a conduit to strainer means, liquid pump means and a storage tank in succession; a motor driving said liquid pump means; an oil detector provided in the upper part of said oil separation tank and electrically coupled to said motor so as to control energization and deenergization of said motor in response to the presence and absence of oil in said oil separation tank; an electromagnetic valve connected to said conduit and upstream of said liquid pump means; said electromagnetic valve coupled to said motor to be opened and closed in response to the energization and deenergization of said motor; said conduit including a branch downstream of said oil separation tank; a full water detector coupled to said branch; said full water detector connected through an air conduit to a second electromagnetic valve, a vacuum vessel and a vacuum pump in succession; said full water detector electrically connected to said second electromagnetic valve to control its opening and closing; a second motor for driving said vacuum pump; and said vacuum vessel including a vacuum switch which serves to control energization and deenergization of said second motor.

2. A suction device as claimed in claim 1, wherein said strainer means comprises two strainers inserted in parallel between two three-way valves.

3. A suction device as claimed in claim 1, wherein said liquid pump means comprises two liquid pumps in parallel.

* * * * *